INVENTOR.
FREDERICK A. THOMAS

INVENTOR.
FREDERICK A. THOMAS

BY

*Greer Marechal, Jr.*
ATTORNEY

3,526,821
CONTROLLED CIRCUITRY FOR CHARGING ELECTRICAL CAPACITORS
Frederick A. Thomas, 1118 1st Ave.,
New York, N.Y. 10021
Filed Sept. 20, 1967, Ser. No. 669,122
Int. Cl. G05f *1/44;* H02m *7/24;* H05b *41/29*
U.S. Cl. 320—1                                20 Claims

ABSTRACT OF THE DISCLOSURE

Controlled charging circuitry for charging and recharging capacitors from a standard source of alternating current and utilizing supplementary or ancillary energy transfer capacitors, instead of energy-wasting resistors, as current limiting devices to avoid heating and losses inherent in conventional practice, while also utilizing multi-voltage power sources and multiplier circuits to achieve faster charging and recharging of capacitors, with a balancing circuit enabling the use and equalizing of storage capacitors in series even when not exactly identical in capacitance.

---

This invention relates to a system or arrangement for charging capacitors in a controlled manner for use in an electric system, and, more particularly, to apparatus for controlling the electrical current used to charge energy storage capacitors so that they may be used economically for operating electric devices designed to require the flow of large electrical currents for short periods of time.

Among such devices may be noted electric welding machines and/or electronic lighting apparatus employing gaseous discharge lamps to produce short duration brilliant flashes of light, which require the momentary flow of hundreds or thousands of amperes of direct current for their proper operation, and it is the charging of the storage capacitors in the electrical systems of these devices to which this invention is specifically especially applicable.

As well understood, it is not practical from a commercial standpoint to obtain such large direct currents even for short periods of time from conventional electrical power sources because it would involve the use of expensive and/or bulky electrical equipment to supply such a large amount of current, even momentarily. Thus, use is frequently made of electrical capacitors in the electronic circuits of such devices to store and provide the necessary large direct currents. That is, electrical capacitors employed in relatively simple circuits accumulate electrical energy at a convenient rate of current flow using conventional power sources over a convenient length of time up to the desired level of energy needed to operate such devices as gaseous discharge lamps, and store this energy at a desired level until it is needed. Thereafter, the capacitors release the stored energy by suitable means at the proper desired rate of flow to perform the work that is required.

For example, an electrical capacitor can be charged to a desired energy level in 100 units of time and, subsequently, much or all of its stored energy may be released or discharged in one unit of time. The average current flowing during the discharge period is approximately 100 times greater than the average current flowing into the capacitor from a conventional power source during the charging period. When electrical capacitors are used for energy storage, difficulties may arise, however, from such facts as that an uncharged capacitor acts as a virtual short circuit when such a capacitor is connected to a source of constant voltage, and sufficient current will flow across the capacitor to make the potential across the plates of the capacitor equal to the voltage of the conventional power source. This charging action can take place instantaneously, causing a very large electrical current to flow from the power source. Such charging current may be large enough to cause an overload or damage to the components of the power supply circuit.

Obviously, it is necessary to employ some means for limiting this charging current to an amount which is within the electrical capacity of the power supply. In the past, this has been generally accomplished by introducing a resistance, or some other form of electrical impedance, between the power source and the storage capacitors. While such a resistance or impedance limits the maximum charging current to a level within the capacity of the power source, it requires that all of the current needed to charge the energy storage capacitor pass through the resistance or impedance. Because of the totally or partially resistive nature of such a current limiting device, losses occur in the form of heating caused by the passage of electrical current through the limiting device.

These losses from heating may consume up to 50% of the total current required to charge the capacitors to the desired level. Such losses, obviously, require much more energy from the power source than is actually utilized for operating the particular electronic equipment involved, and are particularly undesirable with compact or portable equipment because of the additional bulky and expensive apparatus required for producing the stored energy and because such compact and portable equipment must be constructed in order to provide for dissipation of the heat generated by electrical resistance of this nature.

Further, in many of the electronic systems using energy storage capacitors, two single energy storage capacitors, or equal groups of capacitors connected in parallel with each other, are utilized, and are connected in series. This permits the economical use of such storage capacitors because each of the two capacitors connected in series can have a lower voltage rating while still offering in their combined storage capacity the particular voltage required in the electronic system for operating the particular device involved.

In many storage capacitor circuits where two energy storage capacitors are connected in series, however, problems may be encountered in that the voltage applied to the two capacitors during the charging period will divide in proportion to their respective capacities, with the capacitor having the larger capacity having a lower voltage, and the lower capacity capacitor having a larger voltage. In fact, the differences may be so extreme that one capacitor may have a voltage which is in excess of its proper rating. Obviously, the two capacitors must be chosen in such a manner that they have the same capacities. However, in conventional portable electronic apparatus, the cost and effort required in selecting capacitors of actually equal capacity for connection in series with each other in an electronic system for a gaseous discharge flash device, for example, may be prohibitive when thinking in terms of the mass production of such devices.

According to this invention, however, methods and apparatus are provided whereby energy storage capacitors disposed within a simple electronic system are charged from a source of alternating current at any desired average rate of flow, while the charging power source is from a conventional electrical alternating current power source having any desired average rate of current flow, while, at the same time, operating without the use of resistances or electrical impedances, as current limiting devices, and thus eliminating losses caused by the heating of such electrical resistances. The amount of power needed to charge any energy storage capacitors in accordance herewith is, therefore, reduced to the desired energy level required for the particular device in which it is installed. Further, two such energy storage capacitors may be connected in series within a particular electronic system for a simple electronic device without the expense or difficulty involved in choosing two capacitors of the same capacity, and, further, this invention provides systems and controls for controlling the charging current for such charging energy storage capacitors which are simple, economical, and employ electronic components that are readily available and durable in use.

One object of the invention, therefore, is to provide a simple electronic system utilizing energy storage capacitors wherein the average current required to charge said capacitors to the desired voltage of level may be readily and economically adjusted to the capacity of the alternating current power source.

Another object of the invention is to provide an electronic system utilizing energy storage capacitors therein, in which the capacitors are charged in a circuit in which electronic impedances or resistances are eliminated as current limiting devices, thereby eliminating the problem of heat dissipation, and reducing the required energy from the power source necessary to charge the storage capacitors to the desired level.

A further object of this invention is to provide an electronic system of the character described for charging energy storage capacitors where a plurality of such capacitors is disposed in series therein, and in which the effort and expense required to select such capacitors of equal electronic capacitance for connection in series with each other is eliminated.

Still another object of this invention is to provide an electronic system and apparatus of the character described utilizing energy storage capacitors which are charged by an alternating current in which control of the average charging current is accomplished in an effective manner without the use of resistances and/or other impedances, and which is simple, economical, and employs electrical components that are readily available and durable.

Other objects and advantages of this invention will be apparent from the following description, the accompanying drawings, and the appended claims.

Figure 1:
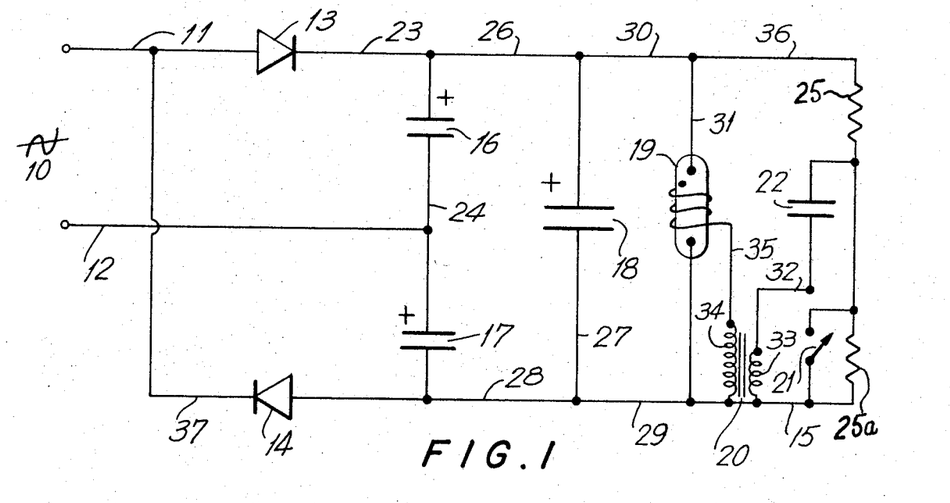
FIG. 1 is a diagrammatic or schematic indication of the electrical circuit for a lamp filled with xenon gas used to produce brilliant flashes of light by discharging the energy stored in electrical capacitors.

In the drawings:

Referring to the drawings, in which like characters of reference refer to like parts throughout the several views thereof, FIG. 1 illustrates a circuit used to produce a brilliant flash of light by discharging the energy stored in electrical capacitors through a lamp filled with xenon gas.

In FIG. 1, 10 designates a source of alternating charging current which is connected to the circuit as through lines 11 and 12. Rectifying diodes 13 and 14 are provided to rectify the alternating current, and 16 and 17 are capacitors of substantially equal electrical capacitance to act as energy transfer capacitors. Energy storage capacitor 18 is provided of substantially greater electrical capacitance than either 16 or 17. Xenon-filled flash tube 19 is to be fired, and 20 is a trigger transformer of the proper turns ratio required, as well understood, to produce a high voltage pulse suitable for ionizing the gas therein for causing the energy storage capacitor 18 to discharge a substantial portion of its electrical energy through the flash tube 19 to produce a brilliant flash of light. Trigger capacitor 22 is charged to the proper voltage through a voltage divider formed by resistances 25 and 25a, and 21 is a conventional switch which, when closed, causes discharge capacitor 22 to discharge through line 32 into the primary winding 33 of transformer 20 to produce the required high voltage pulse at the secondary winding 34, which follows line 35 to the xenon-filled flash tube 19. The construction of the flash tube 19 and of the other components noted is of conventional design, well known in the art, and is not further described.

Referring to the left-hand side of FIG. 1, when a source of alternating voltage is supplied from source 10, and rectifying diode 13 as through lines 23 and 24, permits energy transfer capacitor 16 to receive sufficient current during the positive portion of the alternating current cycle to make the potential across its plates equal to the line voltage at any instant of the positive portion of the charging. The maximum voltage that capacitor 16 charges to is equal to the maximum, or peak, voltage available from the positive portion of the alternating current cycle. The amount of energy stored in 16 is related to its electrical capacitance and to the maximum voltage that appears across its plates.

When the positive portion of the alternating current cycle has passed the peak voltage point, and declines toward zero volts, energy transfer capacitor 16 cannot discharge back into power line 11 because of the effective reverse blocking action of rectifying diode 13. An electrical path is present, however, between capacitors 16 and 18, as through line 26 to the positive plate of capacitors 16 and 18, and through lines 24, 12, 11, 37, rectifying diode 14, lines 28 and 27 to the negative plates of capacitors 16 and 18. Therefore as the positive alternating voltage declines towards zero volts, capacitor 16 is provided with a discharge path as shown above to capacitor 18, until at zero volts, it can be said that capacitors 16 and 18 are effectively connected in parallel with each other and that the electrical energy initially stored in capacitor 16 will be divided, according to well known electrical principles, between capacitors 16 and 18 in direct proportion to the electrical capacities thereof until the point is reached where the voltage of capacitor 16 equals the voltage of capacitor 18. Since the capacity of capacitor 18 is considerably greater than that of capacitor 16, it will be seen that, for the same voltage on both capacitors, the energy stored in capacitor 18 will be proportionately greater than the energy remaining in capacitor 16 and that, during the declining portion of the alternating current cycle, electrical energy is transferred between capacitors 16 and 18.

During the negative portion of the alternating current cycle, the same procedure occurs between capacitor 17 and energy storage capacitor 18. Since the previous half cycle of the alternating current did not reduce the voltage on capacitor 16 completely to zero volts, however, but only to a point of equality between capacitors 16 and 18, capacitor 17 will transfer its energy into capacitor 18 only until the point is reached where the voltage on capacitor 18 is equal to the voltage on capacitor 17 plus the voltage remaining on capacitor 16.

The amount of electrical energy that is transferred to the energy storage capacitor 18 is determined entirely by the maximum voltage to which the energy transfer capacitors 16 and 17 can be charged, and by the voltage point to which they can be discharged, which in turn is determined by the voltage on the energy storage capacitor 18. The length of time required to charge the energy storage capacitor to a given point is determined by the amount of energy that is transferred during each half-cycle of the alternating current and by the frequency of the alternating current.

Preferably, the electrical capacitances of the energy transfer capacitors 16 and 17 are of a value so that the maximum current required to charge the energy transfer capacitor does not exceed the proper current rating of the power source or the current capacity of the rectifying diodes 13 and 14.

The charging rate of the energy storage capacitor 18 through the use of energy transfer capacitors 16 and 17 of the proper value is similar to that of conventional capactitor charging circuits. That is, the greatest current will flow at the start of the charging cycle when the energy storage capacitor 18 is fully discharged. As each succeeding half-cycle of the alternating current causes a certain amount of energy to be transferred to the energy storage capacitor 18, the voltage thereon will rise. As is well known, therefore, since the energy transfer capacitors 16 and 17 can transfer energy only to the point where the voltage of the energy capacitor 18 is equal to the voltage across both energy transfer capacitors 16 and 17, less energy is transferred with each cycle, and less energy is taken from the alternating current power source. The voltage across the energy storage capacitor 18 will eventually be equal to the peak voltage across both energy transfer capacitors 16 and 17, and no further energy transfer will take place and no current will be taken from the alternating current power source.

As is well known, in many uses or applications of energy storage capacitors, it may be desirable to employ two energy storage capacitors in series. This permits the economical use of energy storage capacitors merely because each one may have a lower voltage rating while still offering the flash tube or other devices connected thereto the required voltage necessary to activate them.

However, connecting two energy storage capacitors in series, which are connected to energy transfer capacitors in a circut as described in the foregoing, presents certain problems. The voltage applied to the two energy storage capacitors in series divides in proportion to their respective capacities, with the one with larger capacity having a lower voltage and the one with lower capacity having a higher voltage. This can result in the situation where one capacitor may have a voltage which is in excess of its proper rating, while the other one has a voltage below its proper rating. Obviously, therefore, it becomes necessary to choose two energy storage capacitors having almost exactly the same capacities, which—especially in the mass production of circuits utilizing two capacitors in series—requires a considerable amount of effort and expense in order to make the proper selection, because, as is well known, two seemingly identical capacitors having the same rating may not actually have exactly the same capacities.

Figure 2:
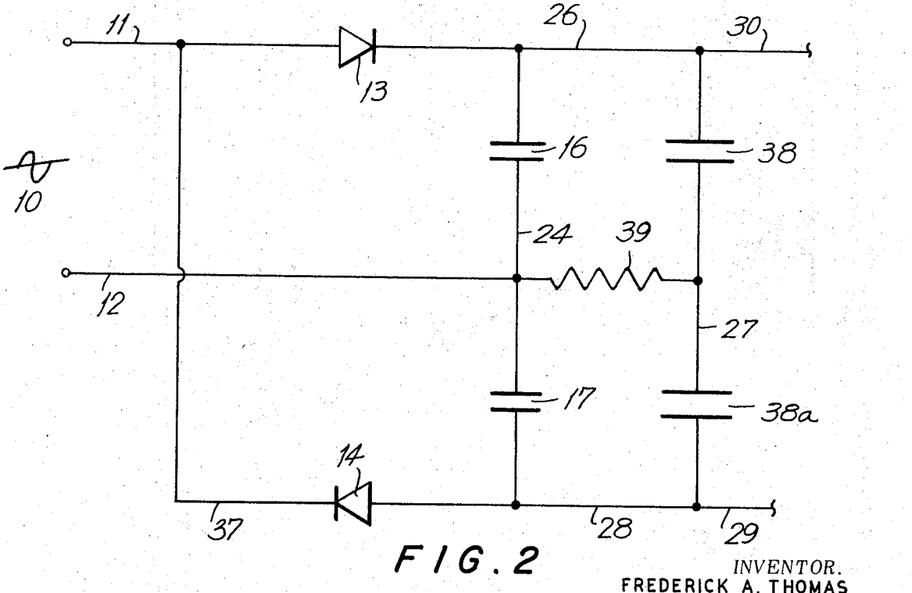
FIG. 2 is a diagrammatic or schematic indication of the electrical circuits and mechanical aspects of a portion of the diagram of FIG. 1 embodying this invention, and including two energy storage capacitors connected in series.

This need for selection is eliminated by an arrangement according to this invention and as shown for example in the diagrammatic circuit of FIG. 2, which incorporates the same charging circuit arrangements as in FIG. 1, but with two energy storage capacitors arranged in series, rather than a single one.

The rectifier diodes and energy transfer capacitors are identical to those illustrated in FIG. 1. The energy storage capacitors consist of two capacitors 38 and 38a of more or less equal value connected in series. In addition, a resistance 39 is interposed in line 12 leading from the alternating current power source 10 to the energy storage capacitors 38 and 38a. This resistance is selected, in well known manner, to have the proper value for contributing only a small portion of the total charge of energy storage capacitors 38 and 38a, as compared to the charging action of the energy transfer capacitors 16 and 17.

In this arrangement, the charging action is the same as that described in FIG. 1 except that the voltage across capacitors 38 and 38a will be equal at the end of the charging period to the sum of the maximum voltages that appear across the energy transfer capacitors 17 and 16, rather than having merely the one energy storage capacitor having that maximum voltage stored therein. The voltages that appear across energy storage capacitors 38 and 38a are divided in inverse proportion to their respective electrical capacitances, as is well known. If a difference in voltage exists between the two, it will appear as a voltage across the resistor 39 which will cause an electrical current to flow in whichever direction is necessary to achieve an equality of voltage between the two energy storage capacitors connected in series. When the voltage across capacitors 38 and 38a are equal, the voltage across the resistor 39 will be zero, and no electrical current will flow. During one half-cycle of the alternating charging current, the energy storage capacitor with the higher voltage will lose part of its charge through the resistor 39, and during the next half-cycle, the capacitor with the lower voltage will receive a charge. This will continue until both capacitors have again achieved equal voltage.

As well understood, when charging energy storage capacitors from a source of constant voltage, either with a current limiting impedance, or with the energy transfer capacitor circuit as described herein, interposed between the power source and the energy storage capacitors, the rate of charge is greatest at the beginning of the charging period and thereafter decreases as the energy storage capacitors approach the voltage of the power source. Indeed, approximately 60% of the total possible charge may take place in less than about 20% of the total required charging time. Further, the last 50% of the total charging time may contribute less than 10% of the total energy stored.

Therefore, particularly in situations where the time required to charge the energy storage capacitors is an important factor (e.g., with flash tube lighting apparatus as noted above where it is desired to fire the flash tube repeatedly with as short as possible a wait while the capacitors recharge between flashes), a substantially higher rate of charge per unit of charging time can be obtained if the power source has a voltage somewhat higher than the desired final voltage of the energy storage capacitor, and if the charging circuit includes means for interrupting the charging current at the desired voltage charge on the capacitors but prior to the maximum possible charge which could be obtained thereon because of the higher voltage power source. That is, by imposing on the charging circuit initially a voltage substantially higher than that to which the capacitors are to be charged, and then interrupting the charging circuit when the desired less than maximum voltage has been achieved on the capacitor, some speed advantage is obtained from the exponential nature of charging the capacitors noted above, and the complete charge desired is obtained in only a fraction of the time which would be required if the original power source voltage were not greater than that which would produce eventually the desired charge.

As a result, many circuits have been devised to interrupt the charging current when a predetermined voltage level is reached in the energy storage capacitor. This substantially decreases the charging time as stated before and also cause the voltage which appears across the energy storage capacitor to be relatively independent of the voltage of the power source. Thus, the circuit will interrupt the charging current only when a certain voltage level is attained in the storage capacitor irrespective of variations in the power source.

This presents certain difficulties, however, when the charging current is supplied to two energy storage capacitors in series, as described above. For, in order to take advantage of the substantial reduction in the charging time, it is necessary that both of the capacitors be carefully selected for equal electrical capacitance.

Obviously, again, this is uneconomical from a commercial standpoint when such circuits are being mass-produced because of the time involved in making such a selection. If both of the capacitors in the series are not of equal voltage, a voltage division between the two capacitors occurs which is inverse to their respective capacities, as has been stated before. Further, manufacturing tolerances are such that two identically marked capacitors could have a substantial voltage division between them where one capacitor would have voltage across it exceeding its recommended operating voltage, while the other has a voltage below its operating rating.

Figure 3:
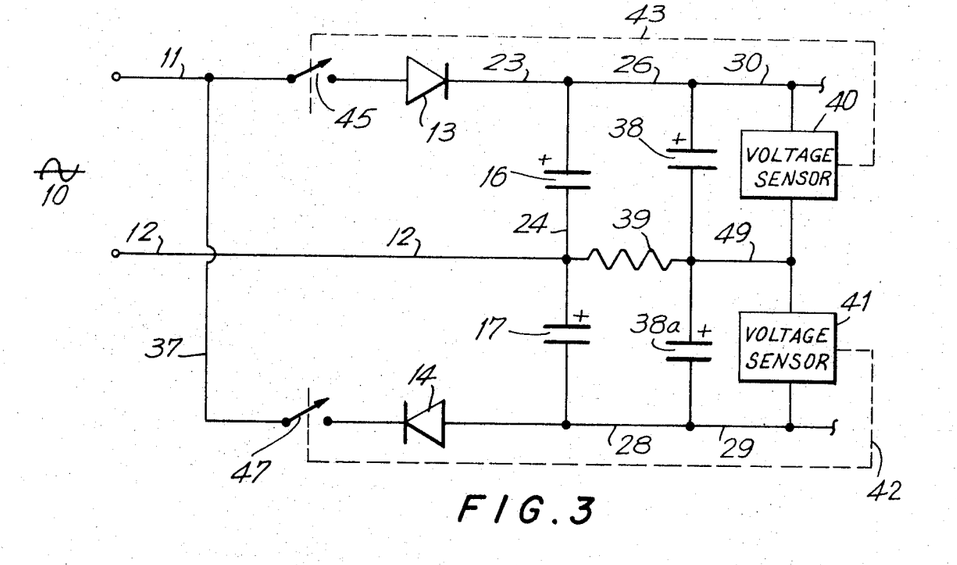
FIG. 3 is a diagrammatic or schematic indication of the electrical circuits and mechanical aspects of a portion of the diagram of FIG. 2, and further embodying a system of controls for two energy storage capacitors connected in series in which the source of power for charging said capacitors is disconnected before the maximum possible charge is obtained, and which will cause both capacitors to have equal and/or predetermined voltages irrespective of their electrical capacities.

It is within the purview of this invention to have more than one storage capacitor connected in series as disclosed above without having the capacities thereof exactly matched. FIG. 3 illustrates a circuit similar to the embodiment shown in FIGS. 1 and 2 with two energy storage capacitors connected in series as shown in FIG. 2, which storage capacitors may be charged from a source of power which is interrupted in such manner before the maximum possible charge is attained, and that will cause each energy storage capacitor to have equal or predetermined voltage irrespective of its electrical capacity. Voltage sensing circuits 40 and 41 are provided as the well known type which produces an electrical control current when the voltage across the sensing elements is below a predetermined level. Relays 45 and 47, when connected to a source of proper electrical current, cause an electrical circuit to be completed. The rest of the circuit is substantially identical to that shown in the embodiment of FIG. 2.

When the circuit of FIG. 3 is connected to a source of alternating current, the voltage across each of the energy storage capacitors 38 and 38a will be below the predetermined desired voltage level. This will cause the voltage sensing circuits 40 and 41 each to produce an electrical control current which flows as through lines 42 and 43, respectively, to the relays 45 and 47. This current activates the relays, causing them to complete an electrical circuit thereby commencing the charging of the energy transfer capacitors 16 and 17 as described above. For example, energy storage capacitor 38 may reach its predetermined voltage level before 38a reaches its predetermined voltage level. Therefore, when this point is reached, the voltage sensing device 40 will cause its electrical control current to cease, which in turn causes the relay 45 to open the electrical circuit in which it is connected. This, in turn, causes both energy transfer capacitors 16 and 17 to cease functioning and energy storage capacitor 38 to cease charging.

However, energy storage capacitor 38a at this point will not have reached its predetermined voltage point and its voltage sensor 41 will still produce an electrical current which in turn causes relay 47 connected thereto to remain closed. Energy storage capacitor 38a, therefore, continues to charge through resistor 39 and rectifying diode 14 as by power lines 12, 49, 29, 28, and 37. Thereafter, when energy storage capacitor 38a reaches its predetermined voltage point, its voltage sensor 41 will cut off the electrical control current through line 42 to relay 47 which will become inoperative and disconnect diode 14 from the source of power 10.

While it is apparent that resistance 39 contributes to the charging of energy transfer capacitors 16 and 17 to some extent, it must be understood that the value of resistance 39 is selected so that it contributes only a relatively small portion of the overall energy stored in transfer capacitors 16 and 17 during the charging period. When either control relay 45 or 47 is opened to interrupt the flow of current, however, all of the current needed to charge whichever of the energy storage capacitors 38 or 38a is still connected must pass through resistance 39. Since in most instances both energy storage capacitors will have substantially although not identically equal capacitances, any heating or subsequent electrical losses resulting from what little current might pass through resistance 39 constitutes a relatively small or insignificant loss of efficiency when compared to the total amount of energy involved, and is certainly not to be compared to the order of magnitude of energy losses encountered when a resistance in the main charging circuit is used as a current limiting means rather than energy transfer capacitors 16 and 17 in accordance herewith.

When the voltage on either energy storage capacitor falls below the predetermined level for any reason (including discharging the capacitor), its respective voltage sensor will automatically activate its respective electrical control current for activating the appropriate relay for closing the charging circuit. This restores the charging circuit to bring the voltage on the respective energy storage capacitor back to the proper predetermined level.

Voltage sensors 40 and 41 can be, as is well known, of the type which operate silicon-controlled rectifiers which can be used in the place of the relay-diode combination 45–13 and 47–14 shown in FIG. 3. Such rectifiers are, as is well known, described as rectifier diodes that are normally inoperative and do not permit electrical current of any polarity to flow through them. However, when an electrical signal is sent to them by sensors such as 40 and 41, of the proper polarity, and when the signal is applied to the proper control point or gate in the rectifier, it becomes operative and conducts in a manner similar to a rectifying diode.

As stated above, it is practical in the use of energy storage capacitors to reduce the charging time by interrupting the charging before the maximum charging level has been reached, which results in a substantial shortening of the time required to reach a desired given level of charge with only a negligible loss in the amount of energy actually stored. However, during the charging period, the electric charging current does not flow at a constant rate but is at its maximum level at the beginning of the charging period and rapidly decreases as the charging continues generally following the well-known exponential charging current curve of a discharged capacitor connected to a source of constant voltage. Therefore, the ideal charging power source for charging energy storage capacitors would supply a charging current at a constant rate during the entire charging period, with the average current flowing being substantially equal to the maximum current at any given time during the charging. This would result in a much more efficient use of the components of the charging circuit in that a more effective transfer of the electrical energy would be brought about in the shortest possible time. This is particularly important in flash-type photographic lighting equipment where it is desired to use the equipment repeatedly during any given period of time.

Figure 4:
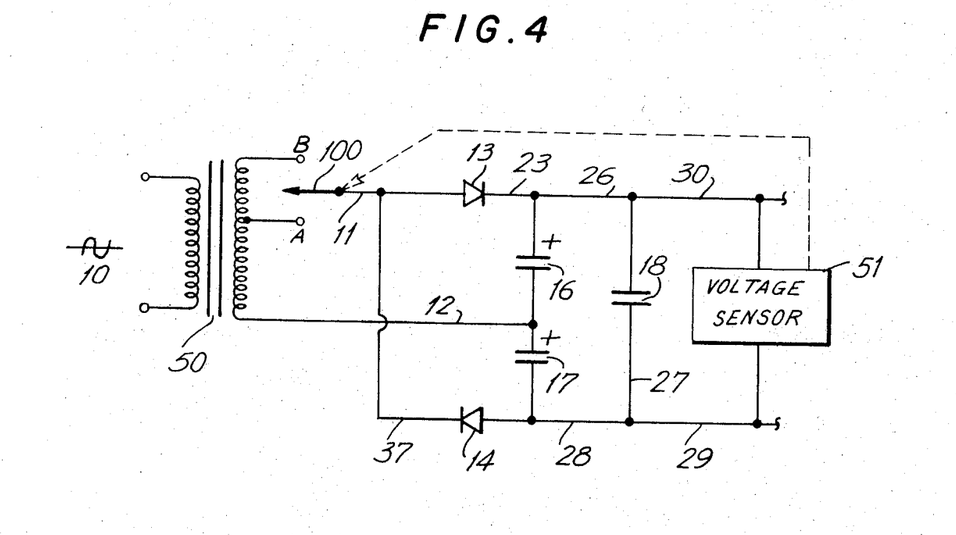
FIG. 4 is a diagrammatic or schematic indication of the electrical circuits and mechanical aspects of apparatus embodying and for practising this invention and including a source of power with a plurality of different selective voltages and means for maintaining the current required for charging the energy storage capacitors within the desired maximum and minimum values during the time required to charge the capacitor to the desired voltage level.

As stated above, such constant current charging circuits are well known, but require complex circuitry and expensive or bulky components. These, of course, are not always suitable for portable equipment, or they may be economically prohibitive for use in such equipment. Nevertheless, FIG. 4 illustrates a portion of the embodiment of this invention indicated in FIG. 1 with a modified circuit which produces a charging current to be held within certain minimum and maximum values during the charging period for energy storage capacitors, and which approximates a more or less constant charging current to a far greater degree than when the charging current is merely interrupted before maximum charge is reached, as described above. Further, such a circuit is simple and economical to construct, with readily available and standard components, and may be primarily characterized as providing for the charging circuit a plurality of different voltages selectively available, as from a transformer or other source, for switching into the charging circuit.

Thus, the embodiment illustrated in FIG. 4 includes the energy transfer capacitors 16 and 17 and a single energy storage capacitor 18 of FIG. 1 (although, as will be apparent, it may also include the plurality of series storage capacitors 38 as previously described), and a voltage sensor circuit 51, like voltage sensors 40 and 41 described in connection with FIG. 3. A principal modification of the apparatus previously described, as will be realized, is inclusion of a transformer 50 the secondary winding of which has a plurality of different voltage outputs available for inclusion by switching means selectively into the charging circuit.

For example, and merely for purposes of illustration, two different voltage outputs A and B are shown in FIG. 4 from transformer 50, with a selector switch 100 for selecting between voltage A or higher voltage B as described below. The voltage at point A on the secondary winding of transformer produces a peak voltage somewhat lower than the voltage desired ultimately to be charged on energy storage capacitor 18, while the voltage at point B of the secondary transformer 50 is a value somewhat higher than that desired on capacitor 18, with switch 100 for selecting between these two voltage levels, and with voltage sensor 51 controlling and sensing the accumulated voltage on the capacitors.

In operation, the switch 100 normally connects voltage tap A into the charging circuit so that energy storage capacitor 18 is charged through the operation of energy transfer capacitor 16 and 17, all as previously described. As the voltage on capacitor rises, the current being used to charge the capacitor will decrease as well understood. The current flowing into the energy storage capacitor charging circuit is directly related to the voltage on energy storage capacitor 18, and so voltage sensor means 51 is provided in the circuit, and so connected therein with regard to capacitor 18 as to become activated when a certain voltage level is reached on capacitor 18, which voltage level may be considered an indication that the charging current has fallen to a certain low point. Voltage sensor means 51 is so arranged, in completely known and well understood manner, so that activation thereof upon accumulation of a certain predetermined voltage on capacitor 18, causes switch 100 to move from voltage tap A on transformer 50 to voltage tap B, thereby increasing the voltage applied to the charging circuit of capacitor 18 with a concomitant increase in charging current. As will be understood with the foregoing, with appropriate selection of the voltage values of the transformer voltage taps A and B and the setting of voltage sensor 51, the charging current for energy storage capacitor 18 can be readily maintained, in accordance herewith, within a relatively narrow range during the entire period for charging capacitor 18.

The design and construction of voltage sensing means 51 is such that, as will be well understood, when the desired voltage level on capacitor 18 is reached, the voltage sensor 51 causes switch 100 to return from voltage tap B to A on transformer 50. Thus, the charging circuit for capacitor 18 is again connected to a lower source of voltage somewhat below the voltage level charged into capacitor 18 at the tap B voltage, so that charging will cease. Should the voltage level of capacitor 18 decrease for any reason, the voltage sensor 51 may be arranged to operate and reconnect switch 100 to higher voltage tap B for recharging capacitor 18 until the desired voltage level is restored and maintained thereon.

Although FIG. 4 illustrates a transformer interposed between the primary source of power 10 and lines 11 and 12 leading into the particular charging and control circuits embodying and for practising this invention, it is to be understood that transformer 50 is indicated as merely illustrative of a primary source of power having available a plurality of different voltage levels for connection between lines 11 and 12, whether such transformer and/or plurality of voltage levels was incorporated in a particular apparatus embodying and for practising this invention or was inherently available at normal wall outlet connections into the power lines of public utilities. Nevertheless, electrical transformers are relatively heavy equipment and tend to introduce electrical losses of some substantial value into circuits in which they are incorporated, and, thus, may not be desired particularly for incorporation in portable electrical equipment.

Accordingly, in order to achieve the advantages of the arrangement indicated in FIG. 4 without the necessity of interposing a separate multi-voltage output transformer in the main power source and the charging circuit, an electronic voltage doubler or tripler circuit may be utilized in accordance herewith and in a manner so that the energy storage capacitors can be charged to a voltage considerably higher than the peak voltage obtainable from the principal alternating current power source, while also partaking of the current limiting and rapid charging advantages hereof as described above. Thus, the embodiment illustrated in FIG. 5 includes such a design in accordance herewith. As shown, rectifying diodes 52, 53, and 13 are connected in series and can be considered, as is well known, as a single diode. In addition, rectifying diodes 54, 56, and 14 are also in series and can be considered to operate as a single diode. The charging of energy storage capacitor 18 commences through the action of energy transfer capacitors 16 and 17 as previously described. The maximum average current that can flow during each half-cycle of the alternating current is determined solely by the voltage of the alternating current, by the electrical capacity of the energy transfer capacitors 16 and 17, and by the voltage which appears across energy storage capacitor 18. The maximum current flows at the start of the charging period when 18 is completely discharged, and the current flowing to the energy transfer capacitors 16 and 17 diminishes as the voltage across 18 increases.

Figure 5:
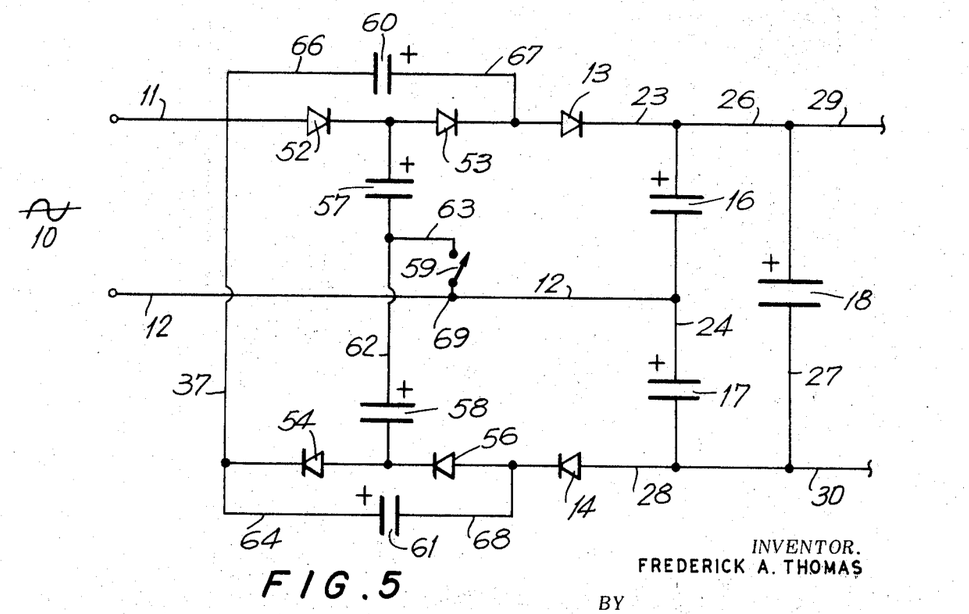
FIG. 5 is a diagrammatic or schematic indication of the electrical circuits and mechanical aspects of apparatus for practising this invention and including means for charging the energy storage capacitor to a voltage level substantially higher than the peak voltage point of the power source without utilizing a transformer.

When the charging current flowing into energy transfer capacitor 16 and 17 falls to a predetermined desired level, the switch 59 is closed by a well known means not shown to complete an electrical connection between the mid-point of capacitors 57 and 58 and one side of the alternating current line. Closing of the switch 59 effectively interconnects 52, 53, and 13 as well as capacitors 57, 60, and 16 to create a conventional voltage tripler circuit. Also, the same switching action causes an interconnection between 54, 56, 14, 17, 58, and 61 to create a second voltage tripler circuit of reverse polarity, with certain interconnecting points between the two tripler circuits as, for example, lines 62 and 24. Therefore, the voltage across energy transfer capacitor 16 reaches a maximum point which is equal to substantially three times the peak voltage of the alternating current source. Energy transfer capacitor 17 also reaches a voltage point level equal to three times the line voltage peak. Since 16 and 17 are connected in series with each other, it is possible for energy storage capacitor 18 to be charged to a level approximately equal to six times the peak line voltage.

For example, if one assumes that the energy storage capacitor 18 has been charged to a point substantially below the desired voltage level therein, energy transfer capacitor 16 has one-half of its voltage across its plate while capacitors 60 and 61 have zero voltage across them. Thereafter, if the switch 59 is closed, the action of the voltage tripler circuits take place. Only the action of one-half of the charging circuit will be described here since a similar action will occur in the other half of the circuit during the alternate half-cycles of the alternating charging current.

With the switch 59 closed, capacitor 57 is connected to the alternating current line at 69 and through lines 63 and 12. During the positive portion of the alternating current cycle, capacitor 57 will charge to the peak voltage point of the alternating current then charging, and since capacitor 16 is connected parallel with capacitor 57 through the diodes 53 and 13, energy transfer capacitor 16 will charge to approximately the same point. During the declining portion of the positive portion of the alternating current cycle, diodes 13, 52, and 53 will effectively block discharge of capacitors 57 and 16 into the power line. However, a discharge path will be created between capacitors 57, 16, and the energy storage capacitor 18 as through the power lines 23, 26, 27, 24, 12, 63, as well as diodes 14, 54, and 56. Therefore, capacitors 57 and 16 will both transfer their electrical energy into energy storage capacitor 18 until a point is reached where the voltage across 18 is equal to the voltage across 16 plus 57. Since both capacitors 57 and 16 require electrical energy, therewill be an increase in the current flow from the power source, and since they both will transfer their energy to 18, a greater amount of energy will be transferred during the half-cycle than was possible with only the transfer capacitor 16 alone.

During the negative portion of the alternating current charging cycle, capacitor 60 is charged through capacitor 57, and diode 53, as by lines 12, 63, 62, 23, and 67. The charge at this point on capacitor 60 is equal to the peak of the alternating current negative voltage plus the additional voltage which results from a division of the electrical energy remaining in capacitor 57 from the previous half-cycle. This energy is divided, as is well known, between the capacitors 57 and 60 in a manner inversely proportional to their respective capacities.

During the next positive-cycle of the alternating current, capacitors 57 and 16 charge again to peak voltage of the alternating current line and, in addition, energy transfer capacitor 16 will receive energy stored in capacitor 60 from the previous negative half-cycle as by lines 67, 23, and 24 and through diode 13. The energy stored in capacitor 60 is divided between capacitors 16 and 18 based on their respective capacities, as was discussed before, and will add to the energy supplied to capacitor 16 by the alternating current, thereby raising the voltage therein to some point above the peak voltage of the alternating current charging line. During the declining portion of the positive half-cycle, energy stored in 16 previously transfer between capacitor 16 and capacitor 18 and the combined voltage across capaictors 16 and 17. If the voltage across 18 at this point is less than the peak voltage of the alternating current line, capacitor 60 transfers some energy into capacitor 18. However, if the voltage in capacitor 18 is equal to or exceeds the peak line voltage, capacitor 60 will transfer no energy into capacitor 18.

Preferably, the proper point of maximum charge on energy storage capacitor 18 is equal to or somewhat higher than two times the peak voltage of the alternating current line. In order to interrupt the charging current in an effective manner, switch 59 is caused to be opened by conventional means not shown. This effectively disconnects the voltage tripling circuits from capacitors 16 and 17, and, since the voltage on energy storage capacitor 18 is already greater than two times the line voltage peak, the transfer capacitors 16 and 17 cannot draw electrical energy from the alternating current line and charging ceases.

Figure 6:
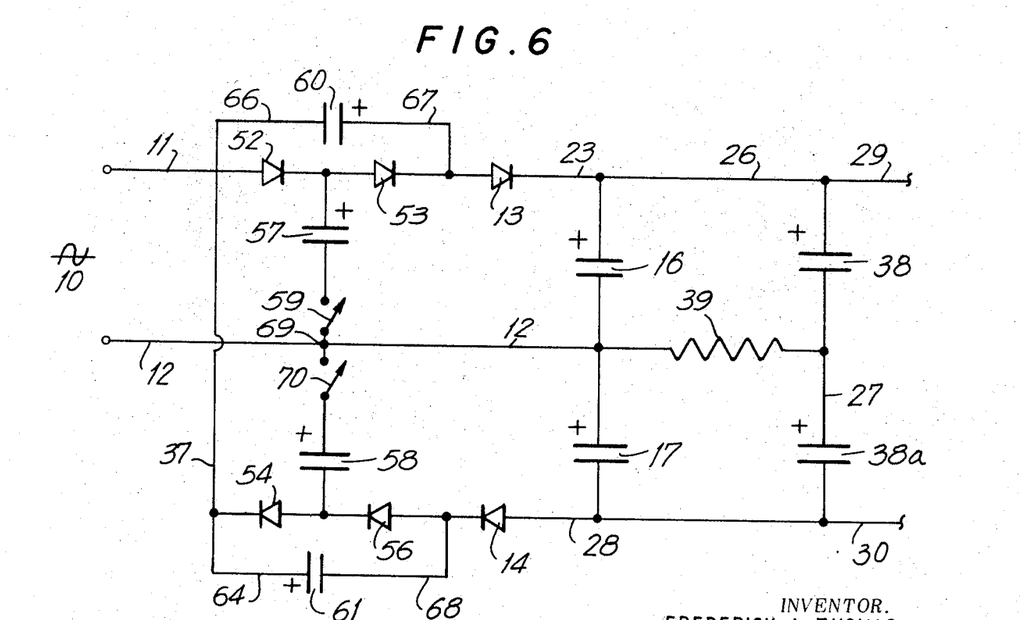
FIG. 6 is a diagrammatic or schematic indication of the electrical circuits and mechanical aspects of the apparatus diagrammed in FIG. 5 but embodying a modification thereof including a plurality of energy storage capacitors connected in series.

The apparatus of the embodiment illustrated in FIG. 6 is a modification of the embodiment described in FIG. 5 in that it contains two energy storage capacitors 38 and 38a in a manner as shown in FIG. 2. Furthermore, a second switch 70 is indicated for energy storage capacitor 38a, so that the two energy storage capacitors connected in series may be charged to voltages independently of each other. As described above, this permits the use of energy storage capacitors that are not of equal electrical characteristics, thus eliminating the necessity of attempting to match such capacitors in an operating circuit.

It is within the purview of this invention that in the various circuits described above in the embodiment of FIGS. 5 and 6 the means for operating the switches 59 and 70 can be operated by conventional automatic means wherein the voltage across the energy storage capacitor 18, or 38 and 38a respectively, is measured by voltage sensitive devices such as voltage sensors 40 and 41 described above with the various switching actions being determined by the reaction of the sensors to the capacitors 38 and 38a reaching a predetermined desired voltage level.

Although the precise values of the various electrical and electronic components utilized in the various combinations and circuits embodying and for practicing this invention will be readily apparent to men skilled in this art after the teachings and disclosures hereof, it may be convenient, merely for completion and purposes of illustration although, obviously, without any limiting intent, to note a few representative values for appropriate components with which satisfactory results have been achieved in a circuit as illustrated in FIG. 1. Thus, satisfactory results have been achieved by having the following components have the following values: energy storage capacitor 18 was rated at 1000 microfarads at 300 volts; energy transfer capacitors 16 and 17 were rated at 50 microfarads at 150 volts; resistances 25 and 25a were each 100,000 ohms; auxiliary capacitor 22 was rated at 0.22 microfarads at 200 volts. In the circuitry of, for example, FIG. 2 having the same components, satisfactory results are achieved with resistor 39 having a value of about 500 ohms at 20 watts. Similarly, incorporating the same rated components noted into circuits such as illustrated in FIGS. 5 and 6, satisfactory results are achieved with capacitors 57 and 58 being rated at 50 microfarads at 150 volts, while capacitors 60 and 61 are rated at 100 microfarads at 250 volts. As will be understood, the foregoing values are noted only for purposes of illustration and are well understood by men skilled in this art who are capable, without even non-inventive experimentation, to appropriate for the various components of the disclosed circuit precise electrical and electronic values within the teaching and disclosures hereof for whatever total values or other characteristics may be desired.

As will be apparent from the foregoing, then, methods and apparatus are provided in accordance herewith for the control and charging of energy storage capacitors in a circuit for producing the momentary flow of hundreds of thousands of amperes of direct current with the use of conventional electrical power sources. Further, such methods and apparatus provide electrical circuits for charging energy storage capacitors without the need for electrical resistances disposed between the source of charging current and the storage capacitors, thus eliminating the need for dissipating the heat caused by such resistances, and reducing the amount of current required for charging the storage capacitors in the first place merely because the elimination of the resistances eliminates the losses occurring in such resistances or impedances arising from the heating caused by the passage of electrical current therethrough. Further, methods and apparatus are provided in accordance herewith for the utilization and realization of enhanced commercial and practical advantages with circuits for charging energy storage capacitors and for controls therefor for increasing the rate of charging of such capacitors and for controlling the range of charging for operating an electrical circuit which is operative within a certain range and inoperative outside that range for the control of various apparatus used for the electrical selection of components, or which can be used to provide an electrical control signal over a certain desired portion of the operation of electrical apparatus.

While the methods and forms of apparatus herein described constitute preferred embodiments of the invention, it is to be understood that the invention is not limited to these precise methods or forms of apparatus, and that changes may be made therein without departing from the scope of the invention which is defined in the appended claims.

What is claimed is:

1. A circuit for controlling the charging of an energy storage capacitor means from an A.C. power source comprising:
   first and second input terminals coupled to said A.C. power source;
   first and second oppositely poled unidirectional current conducting means coupled to one of said input terminals;
   first and second series coupled energy transfer capacitor means having substantially equal capacities coupled between the free ends of said unidirectional current conducting means, the common junction of said series coupled energy transfer capacitor means being coupled to the other of said input terminals;
   energy storage capacitor means, comprising at least first and second series coupled capacitors, coupled in parallel with said energy transfer capacitor means, the capacities of each of said energy transfer capacitor means being substantially less than that of each of said energy storage capacitors;
   resistance means coupled between a common junction of said series coupled energy storage capacitor means and a common junction of said energy transfer capacitor means for equalizing the voltages on said energy storage capacitors notwithstanding possible differences in the individual capacities thereof; and
   output utilization means coupled to said energy storage capacitor means into which said energy storage capacitor means is discharged.

2. A circuit as recited in claim 1 wherein said first and second unidirectional current conducting means are first and second diodes, respectively.

3. A circuit as recited in claim 1 wherein at least some of said series coupled energy storage capacitors have different capacities.

4. A circuit as recited in claim 1 comprising respective voltage sensing means coupled to each of said energy storage capacitors for sensing the voltage on and controlling the flow of charging current to each of said energy storage capacitors separately and individually, said voltage sensing means interrupting charging current flowing to said respective energy storage capacitors when the voltage thereon has reached a first predetermined level and for reestablishing charging current flow to said energy storage capacitor means when the voltage thereon drops below a second predetermined level.

5. A circuit as recited in claim 4 wherein said first predetermined level is below the peak voltage of the output from said power source.

6. A circuit as recited in claim 4 wherein said second level is below said first level.

7. A circuit as recited in claim 1 comprising means coupled between said A.C. power source and said energy storage capacitor means for effectively increasing peak voltage levels of said power source.

8. A circuit as recited in claim 7 in which said means for increasing said peak voltage levels includes a step-up transformer.

9. A circuit as recited in claim 7 in which said means for increasing said peak voltage levels includes a voltage multiplier circuit.

10. A circuit for controlling the charging of an energy storage capacitor means from an A.C. power source comprising:
    first and second oppositely poled unidirectional current conducting means;
    first and second series coupled energy transfer capacitor means having substantially equal capacities coupled between the said unidirectional current conducting means, the common junction of said series coupled energy transfer capacitor means being coupled to said power source;
    first means coupled to said power source and to said unidirectional current conducting means for selectively causing the maximum voltage level to which said energy transfer capacitor means tends to charge, to increase;
    energy storage capacitor means coupled in parallel with said energy transfer capacitor means, the capacities of each of said energy transfer capacitor means being substantially less than that of said energy storage capacitor means;
    voltage sensing means coupled to said energy storage capacitor means and to said first means for automatically increasing the voltage level to which said energy transfer capacitor means tends to charge, when the voltage on said energy storage capacitor means reaches a first predetermined level, thereby increasing the voltage level to which said energy storage capacitor means will tend to charge; and
    output utilization means coupled to said energy storage capacitor means into which said energy storage capacitor means is discharged.

11. A circuit as recited in claim 10 wherein said first and second unidirectional current conducting means are first and second diodes, respectively.

12. A circuit as recited in claim 10 wherein first means includes transformer means having a plurality of voltage outputs from a secondary winding thereof.

13. A circuit as recited in claim 10 wherein said voltage sensing means causes the charging current flow to said energy storage capacitor means to be interrupted when the voltage on said energy storage capacitor means reaches a second predetermined level, said second level being less than the peak voltage of said increased voltage level supplied by said first means.

14. A circuit as recited in claim 13 wherein said voltage sensing means further causes charging current to resume flowing to said energy storage capacitor means when the voltage on said energy storage capacitor means decreases below a third predetermined level to thereby maintain the voltage on said energy storage capacitor means within a predetermined range.

15. A circuit as recited in claim 10 wherein said first means includes a voltage multiplier circuit for increasing said maximum charging voltage level above the peak voltage levels of said A.C. power source; said sensing means selectively enabling said voltage multiplier circuit when said voltage on said energy storage capacitor means reaches said first predetermined level.

16. A circuit as recited in claim 15 wherein said voltage sensing means disables said multiplier circuit when the voltage on said energy storage capacitor means reaches a second predetermined level, thereby lowering the voltage level applied to said energy storage capacitor means and interrupting the charging current flow to said energy storage capacitor means.

17. A circuit as recited in claim 10 wherein said energy storage capacitor means comprises at least first and second series coupled energy storage capacitors; and further comprising resistance means connected between a common junction of said series coupled energy storage capacitors and the common junction of said energy transfer capacitor means for equalizing the voltages on said separate energy storage capacitors.

18. A circuit as recited in claim 17 wherein said voltage sensing means includes first and second voltage sensing means coupled respectively to said first and second energy storage capacitors for sensing the voltage on the respective energy storage capacitors separately and individually, said sensing means automatically increasing the voltage levels individually for each said energy storage capacitors when the voltage on a respective energy storage capacitor reaches said first predetermined level.

19. A circuit as recited in claim 18 wherein each of said voltage sensing means causes the charging current flow to its respective energy storage capacitor to be interrupted when the voltage on its respective energy storage capacitor reaches a second predetermined level which is less than the peak voltage of said increased voltage level.

20. A circuit as recited in claim 19 wherein each of said voltage sensing means further causes charging current to resume flowing in its respective energy storage capacitor when the voltage level thereon decreases below a third predetermined level, to thereby maintain the voltage on each of said energy storage capacitors within a predetermined range.

References Cited

UNITED STATES PATENTS

| | | | |
|---|---|---|---|
| 2,856,565 | 10/1958 | Matulaitis | 315—241 X |
| 3,134,066 | 5/1964 | Townsend | 320—1 |
| 3,290,580 | 12/1966 | Wolff | 321—15 |
| 3,337,787 | 8/1967 | Joseph | 321—16 X |
| 3,339,136 | 8/1967 | Rasor et al. | 320—1 X |
| 3,428,882 | 2/1969 | Gilbert | 323—22 X |

BERNARD KONICK, Primary Examiner

J. F. BREIMAYER, Assistant Examiner

U.S. Cl. X.R.

307—110; 315—241; 321—15; 323—22, 43.5